(12) United States Patent
Huang

(10) Patent No.: US 11,761,570 B2
(45) Date of Patent: Sep. 19, 2023

(54) COUPLER

(71) Applicant: YUAN MEI CORP., Changhua County (TW)

(72) Inventor: Wei-Kai Huang, Changhua County (TW)

(73) Assignee: YUAN MEI CORP., Changhua County (TW)

( * ) Notice: Subject to any disclaimer, the term of this patent is extended or adjusted under 35 U.S.C. 154(b) by 53 days.

(21) Appl. No.: 17/460,280

(22) Filed: Aug. 29, 2021

(65) Prior Publication Data
US 2023/0066775 A1 Mar. 2, 2023

(51) Int. Cl.
| | | |
|---|---|---|
| *F16L 19/00* | (2006.01) | |
| *F16L 27/08* | (2006.01) | |
| *F16L 37/34* | (2006.01) | |
| *F16L 37/24* | (2006.01) | |

(52) U.S. Cl.
CPC ............. *F16L 37/34* (2013.01); *F16L 19/005* (2013.01); *F16L 27/0804* (2013.01); *F16L 37/242* (2013.01)

(58) Field of Classification Search
CPC ... F16L 27/0804; F16L 27/0808; B05B 15/65; B05B 15/68; B05B 15/63; B05B 9/01; B05B 15/652; B05B 15/654; F16L 19/005; F16L 19/0231
See application file for complete search history.

(56) References Cited

U.S. PATENT DOCUMENTS

| | | | | |
|---|---|---|---|---|
| 1,238,994 | A * | 9/1917 | Erickson | F16L 27/0808 |
| | | | | 285/330 |
| 9,108,210 | B1* | 8/2015 | Goodson | B05B 15/68 |
| 2007/0075541 | A1* | 4/2007 | Wu | F16L 27/0816 |
| | | | | 285/272 |
| 2020/0347975 | A1* | 11/2020 | Chen | B05B 15/65 |
| 2021/0268531 | A1* | 9/2021 | Yen | B05B 15/68 |
| 2022/0107043 | A1* | 4/2022 | Chen | B05B 15/65 |

* cited by examiner

*Primary Examiner* — David Bochna
(74) *Attorney, Agent, or Firm* — Che-Yang Chen; Law Office of Michael Chen

(57) ABSTRACT

A coupler, adapted for being assembled and connected with a water sprayer, includes a sleeve and a coupling member adapted for being assembled and connected with the water sprayer. The coupling member and the sleeve are sleeved with each other and respectively have a first corresponding end and a second corresponding end which correspond to each other. The first corresponding end and the second corresponding end are adapted to be engaged with each other, so that the sleeve and the coupling member are capable of being mutually locked and into a non-rotatable state through the engagement and rotation meshing operation. The sleeve can be disengaged with the coupling member through axially moving the sleeve so that the sleeve is allowed to be axially rotatable.

2 Claims, 8 Drawing Sheets

COUPLER

BACKGROUND OF THE PRESENT INVENTION

Field of Invention

The present invention relates to an element for coupling a water sprayer and a hose.

Description of Related Arts

The present invention relates to a coupler for a water sprayer, and more particularly to providing a connection element connecting a water sprayer with a hose. The water sprayer comprises a handle capable of being grasped by a user and comprises a spray nozzle capable of spraying out of water. The handle has an inlet for providing liquid to enter the water sprayer. The inlet has a connector. The connector is provided for assembling a connection element. The connection element is utilized for being connected with a hose.

For example, there are features of the attachment mechanism of the hose attachment of Patent No. CA3087128, which comprises a rotary joint and an insertion handle, wherein the rotary joint has a hose thread, a hose seal base, a rotary sealing surface, and a rotating shoulder, wherein the rotating shoulder is adjacent to a rotating opening concentrically disposed around the central axis. Besides, the insertion handle has a rotating groove of a rotary sealing member staying sealingly contact with the rotary sealing surface, a first handle shoulder contacting the rotating shoulder, and a handle joint disposed to rigidly connected with the hose accessory.

SUMMARY OF THE PRESENT INVENTION

Before the illustration of the drawings of the embodiments of the present invention, it should be noted that the present application shall not be limited in the details or methods illustrated in this specification or the drawings. It should also be understood that the terms shall only be utilized for description, rather than limit.

The present invention illustrates and describes a coupler for connecting a water sprayer and a hose. The water sprayer includes a handle for a user to grasp and a splash sprayable spray nozzle, wherein the handle has an inlet end for liquid to enter the water sprayer, wherein a connector is provided at the inlet end. The connector at the inlet end is for being locked to an end of the coupler. Besides, the hose has a connector for being locked to the other end of the coupler by means of rotating coupler to be assemble on the connector of the inlet end and allowing the hose to be rotatingly assembled with the coupler. The coupling of the present invention comprises a sleeve and a coupling member and a main object is to allow the sleeve and the assembly to be engaged and locked with each other, so that the coupler is rotatably assembled to the handle. Meanwhile, the sleeve and the coupling member may be disengaged and unlocked with each other, so that the sleeve is allowed to perform two functions of freely rotating according to the handle as the central axis.

Also, the coupling member has a first screw portion which is adapted to be matchingly rotatingly assembled to the connector of the inlet end of the handle. Besides, the sleeve has a second screw portion which is adapted to be matchingly rotatingly assembled to the hose joint. Here, the coupling member and the sleeve respectively have a first corresponding end and a second corresponding end which are engagement devices capable of correspondingly engaging and meshing with each other. Through an operation to rotate the first corresponding end and the second corresponding end until they are meshed with each other, it allows the coupling member and the sleeve lock each other and become not rotatable. Through an operation of axial movement, the first corresponding end and the second corresponding end are disengaged from each other, so that the sleeve is allowed to independently axially rotate.

The present invention provides a locking control engagement device to allow the coupling member be easily rotated and assembled onto the connector at the inlet end when the sleeve and the coupling member are locked with each other. Besides, it allows the sleeve and the coupling member be disengaged when the user properly exerts an axial pulling force to move the sleeve in an axial direction, so that the sleeve is allow to rotate around the handle according to the central axis for the turning of the operation of the water sprayer or for preventing knotting of the hose when moving.

Accordingly, when the water sprayer is connected with the hose through the coupler, the sleeve of the coupler can rotate independently so as to reduce the twisting of the hose when the water sprayer is operating watering with transverse movement, which decreases the discomfort of the wrist of the user, and enhances the convenience of using the water sprayer to operate rotary watering movement.

DETAILED DESCRIPTION OF THE PREFERRED EMBODIMENT

Referring to FIGS. 1, 2, 3, and 5, a coupler according to a preferred embodiment is illustrated.

Figure 1:
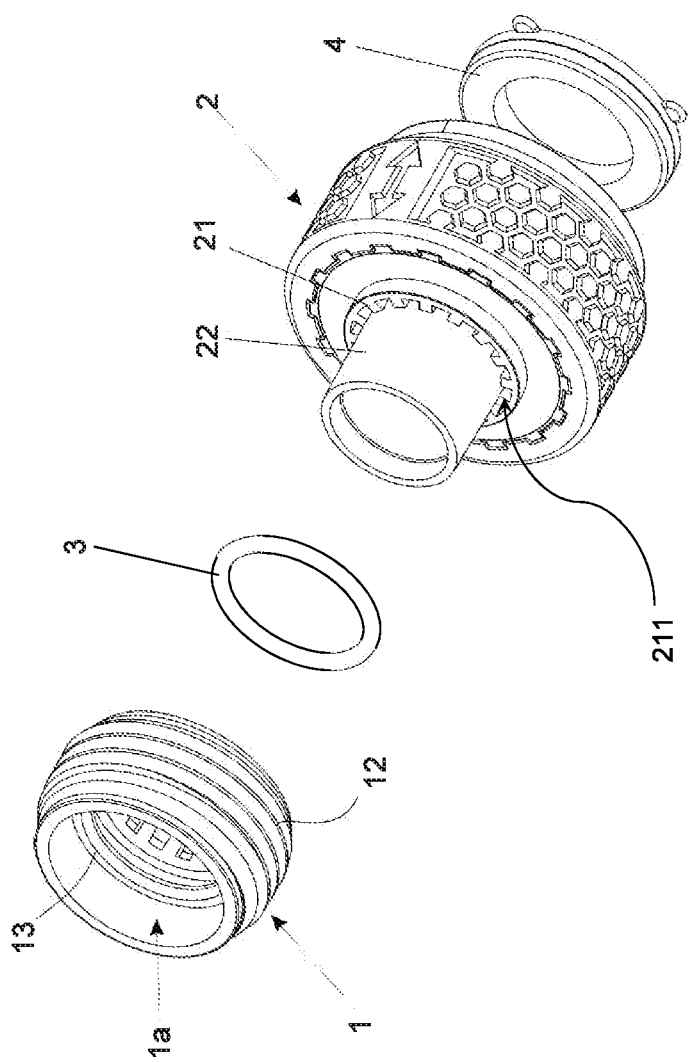
FIG. 1 is an exploded view of the present invention.
Figure 2:
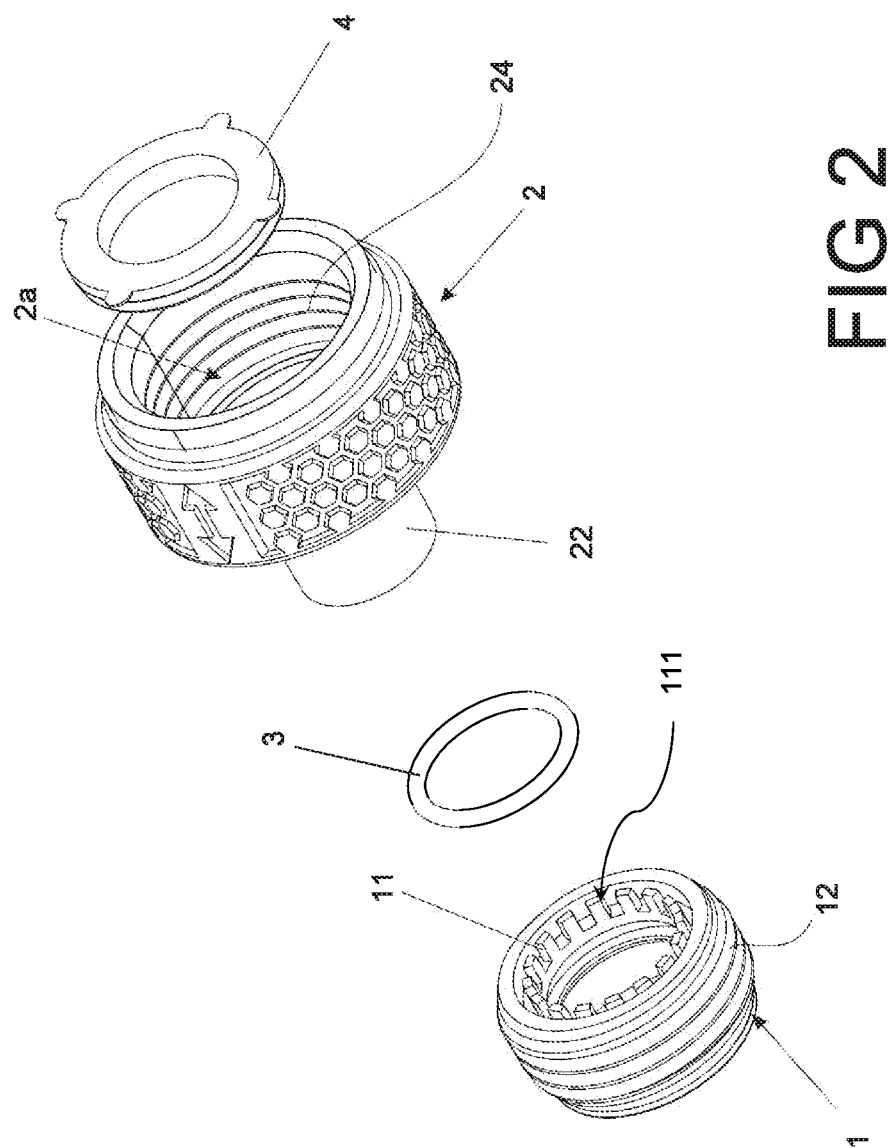
FIG. 2 is an exploded view of another direction of the present invention.

For a specific implementation, FIGS. 1 and 2 illustrate a coupler, comprising a coupling member (1) and a sleeve (2). The coupling member (1) has a first screw portion (12), while the sleeve (2) has a second screw portion (24). Here, the coupling member (1) and the sleeve (2) respectively have a first corresponding end (11) and a second corresponding end (21) capable of corresponding to each other. The first corresponding end (11) and a second corresponding end (21) are engagement devices capable of correspondingly engaging and meshing with each other. Through an operation to rotate the first corresponding end (11) and the second corresponding end (21) until they are meshed with each other, it allows the coupling member (1) and the sleeve (2) lock each other and become not rotatable to each other. Through an operation of axial moving the sleeve (2) leading the end faces of the first corresponding end (11) and the second corresponding end (21) be disengaged from each other, it allows the coupling member (1) and the sleeve (2) to freely rotate while staying assembled with each other, which is allowing the sleeve (2) to freely rotate on the coupling member (1).

Figure 3:
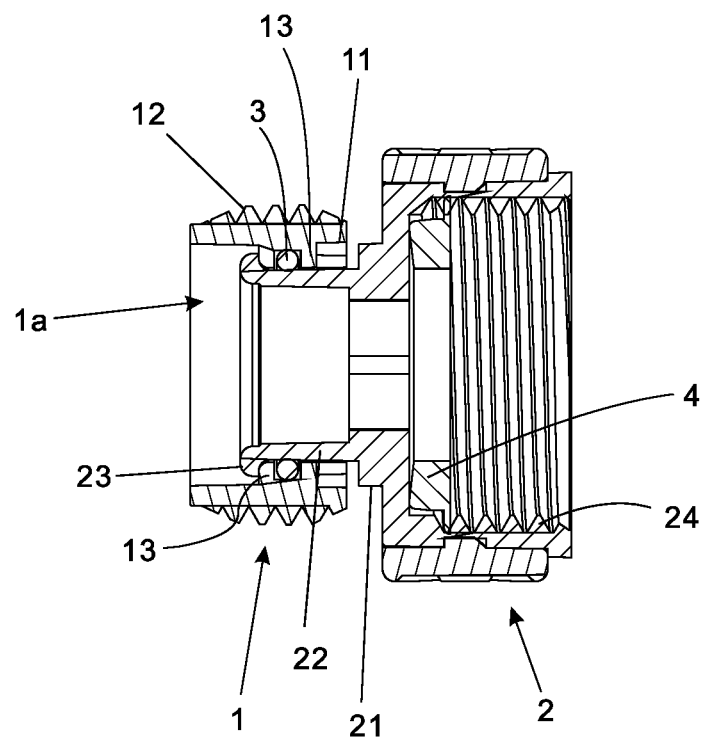
FIG. 3 is sectional view of a sleeve and a coupling member in a non-engaging state according to the present invention.
Figure 4:
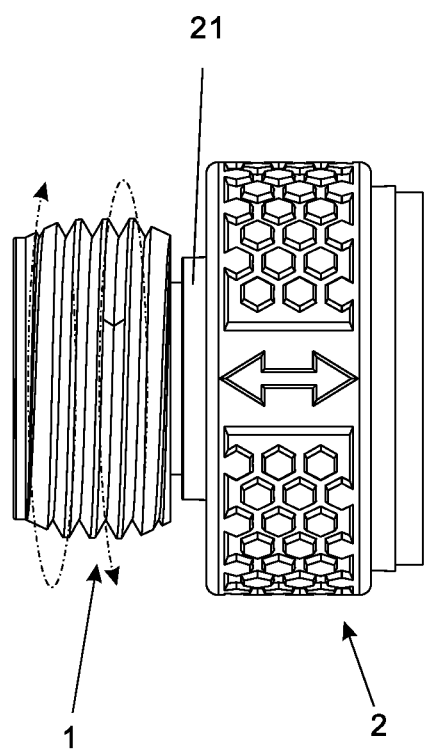
FIG. 4 is perspective view of a sleeve and a coupling member in an unlock state according to the present invention.
Figure 5:
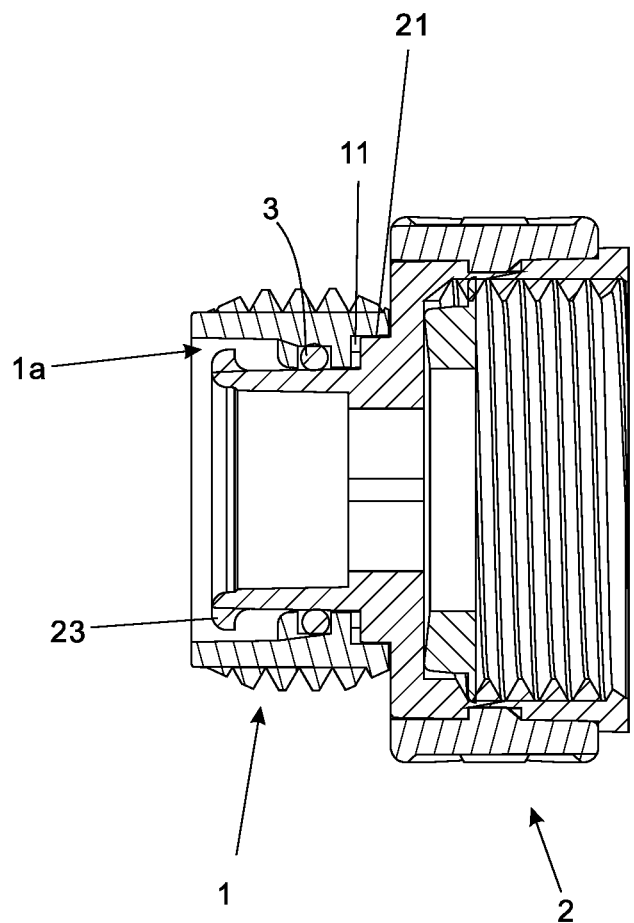
FIG. 5 is sectional view of a sleeve and a coupling member in an engaged state according to the present invention.
Figure 6:
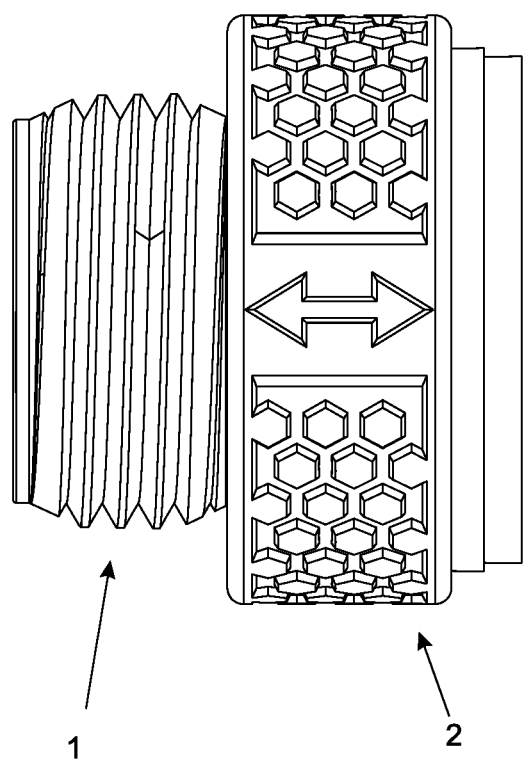
FIG. 6 is perspective view of a sleeve and a coupling member in a locked state according to the present invention.

Further, referring to FIGS. 3 and 5, the sleeve (2) has an elongated shaft tube (22) and the coupling member (1) has a channel (1a) in a tubular form, wherein the channel (1a) has a surrounding flange (13), wherein the shaft tube (22) of the sleeve (2) is inserted into the channel (1a) of the coupling member (1) and the end of the shaft tube (22) has an enlarged end (23), wherein the outer diameter of the enlarged end (23) is larger than the flange (13) of the coupling member (1). A further definition is that the enlarged end (23) of the shaft tube (22) is slightly larger than the flange (13), so that the shaft tube (22) can be moved axially on the coupling member (1) within a limited distance without departing from the coupling member (1).

Further, the enlarged end (23) is affixed onto the end of the shaft tube (22) through molding, stamping forming or ultrasonic bonding.

Further, the flange (13) has a soft ring (3) sleevingly arranged thereon. The bottom (2a) of the inner diameter of the second screw portion (24) has a seal gasket (4) sleevingly arranged thereat.

Continuing with FIGS. 3 to 6, the engagement device is utilized to lock the coupling member (1) and the sleeve (2) together, so as to allow the coupling member (1) to be locked when being rotated to the connector of the handle. In addition, when the sleeve (2) is moved axially, the engagement device does not interlock, allowing the sleeve (2) to freely rotate on the coupling member (1).

Figure 7:
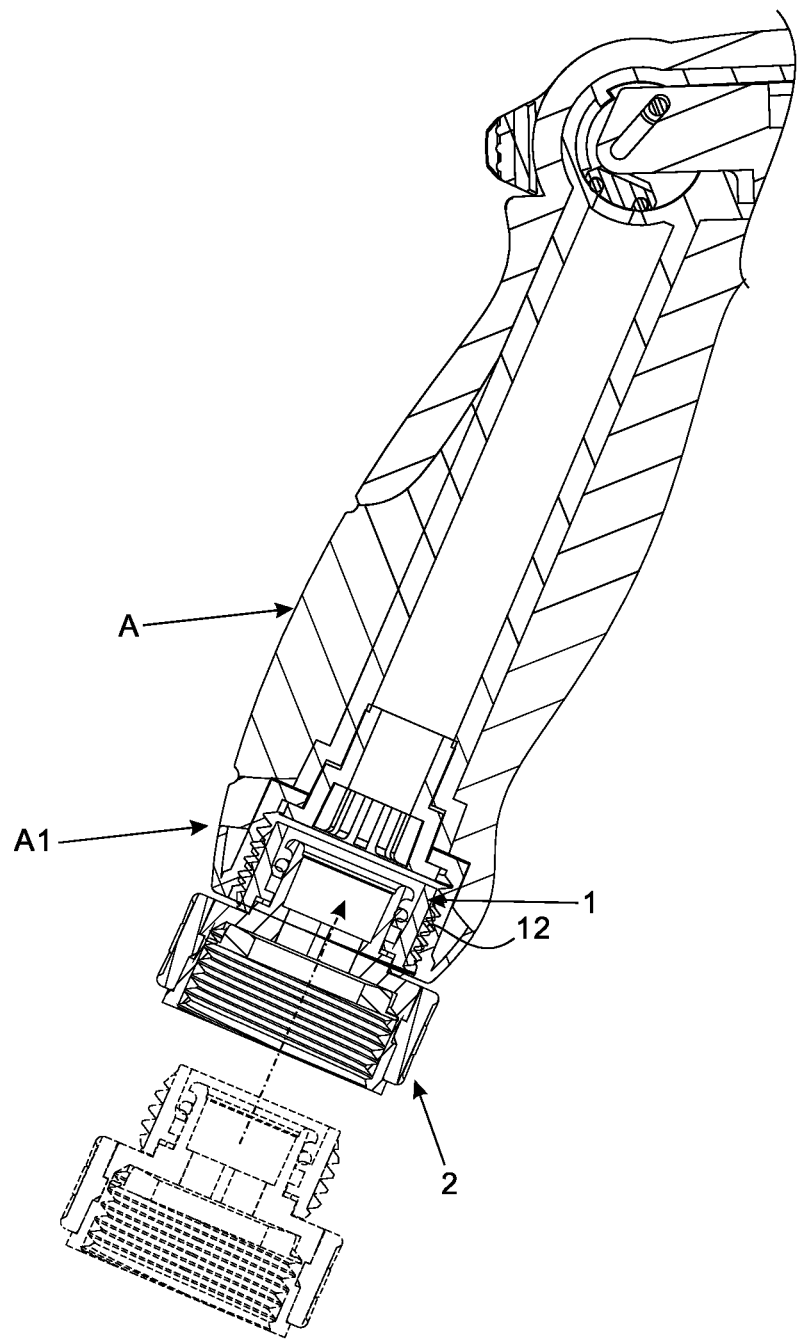
FIG. 7 is a sectional view of an implementation of assembling of the present invention onto an inlet connector of a handle of a water sprayer.
Figure 8:
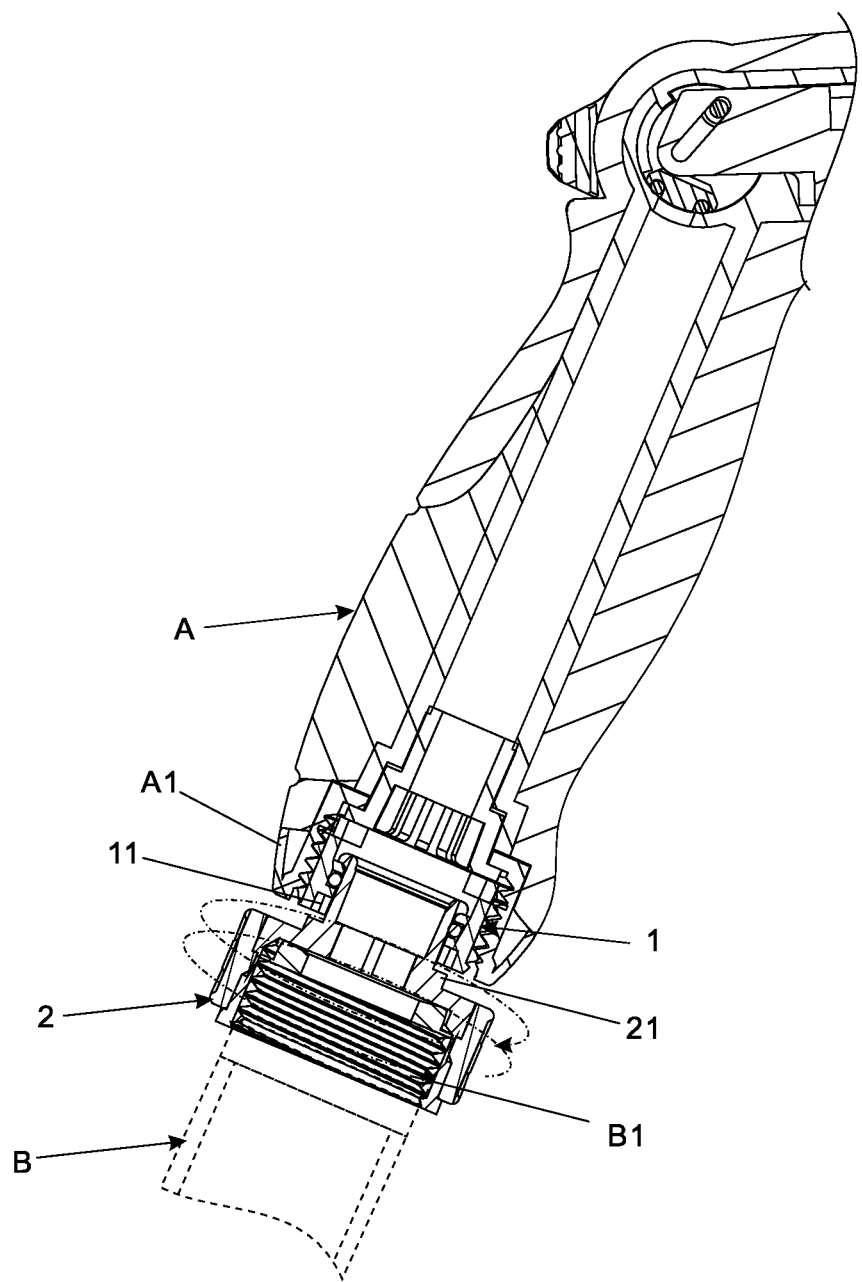
FIG. 8 is a sectional view of an implementation of assembling of the present invention respectively with an inlet connector of a handle of a water sprayer and a hose connector, wherein when the coupling member and the sleeve are in an unlock state, the sleeve is rotatable.

Further, referring to FIGS. 7 and 8, the first screw portion (12) is capable of being matchingly rotatingly assembled to the connector at the inlet end (A1) of the handle (A). Also, the second screw portion (24) is capable of being matchingly rotatingly assembled to the connector (B1) of the hose (B).

Besides, the first corresponding end (11) and the second corresponding end (21) have at least part of or full of the circular edge thereof having a plurality of teeth or tooth spaces formed thereon, wherein the engaging or cogging surface of the plurality of the teeth and tooth spaces is as illustrated in FIGS. 1-3.

The following further illustrates controlling features of the engagement device of the present invention. The first corresponding end (11) is integrally formed on the bottom of the inner diameter wall of the coupling member (1) in a form of a plurality of claws (111), as shown in FIG. 2. The second corresponding end (21) is integrally formed on the bottom of the outer diameter wall of the shaft tube (22) of the sleeve (2) in a form of a plurality of tooth spaces (211), as shown in FIG. 1, wherein the tooth spaces (211) are adapted to correspondingly engage and mesh with the claws (111) to perform a twist control characteristic, wherein the engaging and meshing interaction will be further illustrated below. The claws (111) of the first corresponding end (11) are preferably integrally formed on the bottom of the inner diameter wall, wherein the structural member of the claw (111) is formed from the inner diameter wall of the coupling member (1). The tooth spaces (211) of the second corresponding end (21) are preferably integrally formed on the bottom of the outer diameter wall of the shaft tube (22) of the sleeve (2).

FIG. 7 illustrates an operation of the connection of the present invention with a water sprayer. When the sleeve (2) axially moves on and along the coupling member (1), it meshes and locks the first corresponding end (11) with the second corresponding end (21), rendering the coupling member (1) and the sleeve (2) incapable of rotating against each other and causing the first screw portion (12) be rotatingly locked onto the connector (A1) of the handle (A) of the water sprayer, so that the coupling member (1) and the sleeve (2) are together assembled with the connector (A1) of the handle (A).

FIG. 8 illustrates an operation of the connection of a water sprayer and a hose through the present invention. When the sleeve (2) axially moves in an opposite direction along the coupling member (1), the first corresponding end (11) and the second corresponding end (21) will separate from each other, which allows the sleeve (2) to rotate on the coupling member (1). Here, the second screw portion (23) can be locked on the connector (B1) of the hose (B) through rotating the sleeve (2), such that when the water sprayer rotates, the coupling member (1) will rotate along with the rotation of the water sprayer, but the sleeve (2) will not rotate. Therefore, the hose (B) following the sleeve (2) will not be turned relatively.

The engagement devices that have the coupling member (1) and sleeve (2) interlocked with each other are especially important. According to an embodiment of the present invention, the first corresponding end (11) is has a plurality of protruding teeth (111) and the second corresponding end (21) is has a plurality of tooth spaces (211). This corresponding arrangement of protruding teeth (111) and tooth spaces (211) is preferable because it ensures that the coupling member (1) and the sleeve (2) can be tight locked on the connector (A1) without being loosened. Meanwhile, the engagement device is arranged in a manner that the coupling member (1) and the sleeve (2) are just bucked with each other rather than overly locked and bonded. Therefore, the sleeve (2) can be axially moved easily, so as for disengaging the sleeve (2) and the coupling member (1).

As various changes may be made in the form, construction, and arrangement of components herein without departing from the spirit and scope of the present invention and without sacrificing any advantages thereof, it should be understood that all matter herein is to be interpreted as illustrative and not in a limiting sense.

What is claimed is:

1. A coupler for connecting a hose with an inlet end of a handle of a sprayer, comprising:
   a coupling member having a tubular shape defining a channel therein, a flange surrounding said channel, a first screw portion configured for matchingly and rotatingly assembling to a connector at the inlet end of the handle of the sprayer, and a first corresponding end integrally formed on a bottom of an inner diameter wall of said coupling member, wherein said first corresponding end has a plurality of protruding teeth integrally formed on said bottom of said inner diameter wall of said coupling member; and
   a sleeve comprising:
   an elongated shaft tube;
   an enlarged end, affixed to an end of said shaft tube, having an outer diameter slightly larger than said flange of said coupling member such that said shaft tube is able to be moved axially on said coupling member within a limited distance without departing from said coupling member;

a second screw portion configured for matchingly and rotatingly assembling to a connector of the hose; and a second corresponding end, integrally formed on a bottom of an outer diameter wall of said shaft tube and configured to be engaging and meshing with said first corresponding end of said coupling member, having a plurality of tooth spaces integrally formed on said bottom of said outer diameter wall of said shaft tube and configured to correspondingly engage and mesh with said protruding teeth to perform a twist control that when said sleeve axially moves on and along said coupling member, said sleeve meshes and locks said plurality of protruding teeth of said first corresponding end with said plurality of tooth spaces of said second corresponding end, rendering said coupling member and said sleeve incapable of rotating against each other and causing said first screw portion be rotatingly locked onto the connector of the handle of the sprayer, such that said coupling member and said sleeve are together assembled with the connector of the handle of the sprayer, and that when said sleeve axially moves in an opposite direction along said coupling member, said plurality of protruding teeth of said first corresponding end and said plurality of tooth spaces of said second corresponding end separate from each other to allow said sleeve to rotate on said coupling member, such that said second screw portion is able to be locked on the connector of the hose through rotating said sleeve in such manner that when the sprayer rotates, said coupling member rotates along a rotation of the sprayer while said sleeve and the hose connected to said sleeve are not rotatable with each other.

2. The coupler, as recited in claim 1, further comprising a soft ring sleeving arranged on said flange and a seal gasket sleevingly arranged at a bottom of an inner diameter of said second screw portion of said sleeve.

* * * * *